No. 725,568. PATENTED APR. 14, 1903.
H. G. JOHNSTON.
COUPLING FOR WELL DRILLING MACHINES.
APPLICATION FILED AUG. 5, 1901.
NO MODEL.
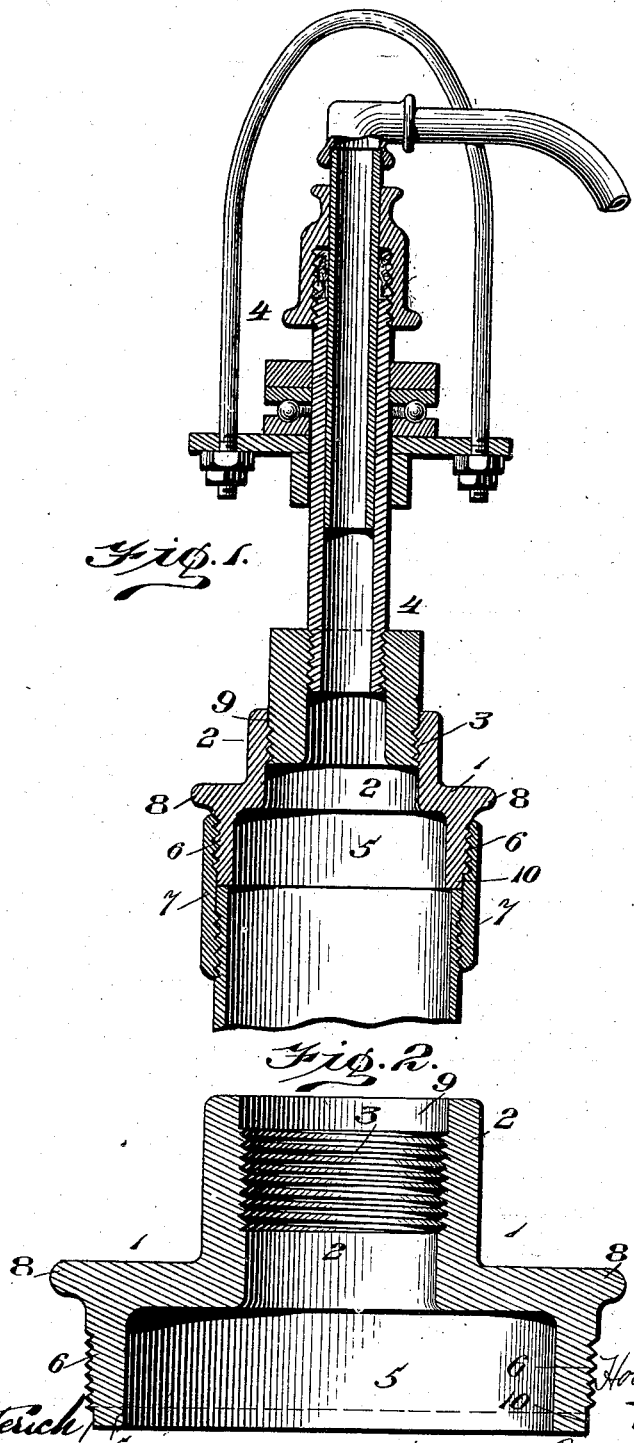

UNITED STATES PATENT OFFICE.

HORACE G. JOHNSTON, OF CORSICANA, TEXAS, ASSIGNOR OF ONE-HALF TO WILLIAM P. STURM AND JACOB W. STURM, OF CORSICANA, TEXAS.

COUPLING FOR WELL-DRILLING MACHINES.

SPECIFICATION forming part of Letters Patent No. 725,568, dated April 14, 1903.

Application filed August 5, 1901. Serial No. 70,976. (No model.)

*To all whom it may concern:*

Be it known that I, HORACE G. JOHNSTON, a citizen of the United States, residing at Corsicana, in the county of Navarro and State of Texas, have invented certain new and useful Improvements in Couplings for Well-Drilling Machinery; and I do hereby declare the following to be a full, clear, and exact description of the invention, such as will enable others skilled in the art to which it appertains to make and use the same.

This invention relates to improvements in couplings for connecting hydraulic swivels to well-casings in well-drilling apparatus.

It consists in a coupling having an elongated neck for connecting the said casing-head to a swivel-supporting mechanism whereby the coupling can be gripped by a suitable instrument for turning it and screwing it to said supporting means, the said coupling being provided with internal and external screw-threads and having means for protecting the said external threads, so that they will not be readily injured.

It further consists in certain other novel constructions, combinations, and arrangements of parts, as will be hereinafter fully described and claimed.

In the accompanying drawings, forming a part of this application, Figure 1 represents a central vertical section through a coupling constructed in accordance with the present invention, the said coupling being shown as connected with a well-casing and with a supporting swivel mechanism. Fig. 2 is an enlarged central section through the said coupling.

This invention is designed to supply a coupling for connecting the hollow cylindrical casings of a well-boring apparatus with a hydraulic swivel of ordinary construction, so that steam or water may be forced through the casing while the same is being revolved for clearing the boring-tools of materials upon which they have operated. In developing this invention in a practical manner I form such a coupling with a body portion 1, providing the same with an upwardly-extending elongated neck portion 2. The neck portion 2 is internally threaded, as at 3, for engaging corresponding threads on the lower end of a hydraulic-swivel-supporting mechanism 4, as clearly illustrated in Fig. 1. While the supporting mechanism of the well-tubing may be of any desired construction, yet my improved coupling is particularly well adapted for use in connection with a hydraulic supporting-swivel through which steam or water may be forced for clearing the boring-tools of materials acted upon while the tubing or well-casing is being revolved. The coupling is also provided with a downwardly-projecting flange 5, which is threaded exteriorly, as at 6, so that it is capable of engaging screw-threads carried by the well-casing or by sleeves, as 7, secured thereto for firmly securing the coupling in position upon the end of the casing. The body portion of the coupling is also provided with an annular projecting flange 8, which extends beyond the periphery of the flange 5 a sufficient distance to ward off anything which might otherwise come in contact with the threads 6 on the outer surface of said flange 5. By the use of a simple flange like the one just described I find that the threads 6 are not only well protected from injury from being brought into contact with the derrick-platform used in drilling the well, but that the said threads are well protected by the said flange from objects which are likely to fall against the threads when using the drilling apparatus.

In order to make the coupling easy of application to the hydraulic swivel and the casing, I preferably cut away the threads 3 for a short distance, as at 9, at the upper end of the neck 2, so that the lower end of the supporting swivel mechanism can be quickly and easily directed so as to engage the threads 3 within the neck 2. I also cut away the threads 6 on the outer periphery of the flange 5 for a short space, as at 10, so that the coupling may be quickly centered over the end of the casing and its threads be readily brought into engagement with the threads of the casing-sleeve 7.

I find in using a coupling of this character that very satisfactory results are attained. The neck 2 being made of a suitable length is easily gripped by a suitable instrument— as, for instance, a chain tongs—for securing the said coupling upon the end of the supporting hydraulic swivel or into the end of the casing-sleeve 7. The flange 8 is also found to be very effective in warding off injurious articles and protecting the screw-threads 6, and yet the said flange is not at all in the way of the operation of well-boring. The cutting away of the threads saves in time and trouble in assembling the parts of a well-boring apparatus employing such a coupling, as well as coacting with the flange 8 for prohibiting contact of foreign objects with threads 6, the coupling on coming into contact with such object striking first with the flange 8 and either rebounding or coming to a diagonal plane relative to said object, in which latter case the threads 6 will not be injured, but the smooth portion 10 will strike and perfectly guard said threads, such foreign object lying across from its point of contact with the flange 8 to its point of contact with said smooth portion.

In constructing couplings of this kind I usually make the neck 2 of uniform size, changing the diameter of the flange 5 to accommodate the different-sized well-casings. This is necessary, since casings of various sizes are employed, while the hydraulic swivel mechanism is generally provided with connecting means of one size or diameter only.

Having now described my invention, what I claim as new, and desire to secure by Letters Patent, is—

1. A device of the class described, comprising a ring forming a body portion, a flange extending downwardly therefrom and formed with exposed threads, a guard at the end of said flange, and a guard-flange extending from the main body portion and projecting beyond the plane of the threads and coacting with said guard at the end of the first-mentioned flange, substantially as described.

2. A device of the class described, comprising a ring forming a body portion, a flange extending upwardly from said body portion, a flange extending downwardly from said body portion and formed with exposed threads for a portion of its length, the remaining portion being left smooth, and a guard carried by said main body and projecting beyond the vertical plane of the exposed threads sufficiently far to prevent contact therewith of contiguous foreign objects, substantially as described.

3. A device of the class described, comprising a ring forming a main body portion, a flange extending upwardly therefrom and forming an exterior shoulder, a flange of larger diameter extending downwardly therefrom and forming an internal shoulder, threads on the outside of the downwardly-extending flange for a portion of its length, the outer edge of the flange being left smooth, and a guard extending laterally from said main body beyond the vertical plane of said threads, substantially as described.

In testimony whereof I hereunto affix my signature in presence of two witnesses.

HORACE G. JOHNSTON.

Witnesses:
 DON HAGLER,
 WILLIAM G. EDGAR.